United States Patent
Park et al.

(10) Patent No.: US 12,204,772 B2
(45) Date of Patent: Jan. 21, 2025

(54) MEMORY DEVICES AND METHODS FOR MANAGING USE HISTORY

(71) Applicant: Samsung Electronics Co., Ltd., Suwon-si (KR)

(72) Inventors: Changhwi Park, Suwon-si (KR); Junyoung Ko, Suwon-si (KR); Jungmin Bak, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/195,587

(22) Filed: May 10, 2023

(65) Prior Publication Data

US 2024/0160362 A1  May 16, 2024

(30) Foreign Application Priority Data

Nov. 11, 2022  (KR) ........................ 10-2022-0151008

(51) Int. Cl.
*G06F 3/06* (2006.01)

(52) U.S. Cl.
CPC .......... *G06F 3/0623* (2013.01); *G06F 3/0634* (2013.01); *G06F 3/0659* (2013.01); *G06F 3/0673* (2013.01)

(58) Field of Classification Search
CPC .... G06F 3/0623; G06F 3/0634; G06F 3/0659; G06F 3/0673
USPC ........................................................ 711/163
See application file for complete search history.

(56) References Cited

U.S. PATENT DOCUMENTS

| | | | |
|---|---|---|---|
| 7,653,778 B2 | 1/2010 | Merry et al. | |
| 7,743,203 B2 | 6/2010 | France | |
| 8,108,180 B2 | 1/2012 | Astigarraga et al. | |
| 8,806,106 B2 | 8/2014 | Goss et al. | |
| 10,268,598 B2 | 4/2019 | Ping et al. | |
| 2007/0078770 A1 | 4/2007 | Hsieh | |
| 2008/0162079 A1* | 7/2008 | Astigarraga | G11C 16/349 702/182 |
| 2008/0279005 A1* | 11/2008 | France | G11C 16/3418 365/185.11 |
| 2011/0219240 A1* | 9/2011 | Sun | G11C 7/10 711/E12.091 |
| 2014/0297975 A1* | 10/2014 | Ping | G06F 11/3037 711/156 |
| 2017/0308447 A1 | 10/2017 | Wu | |
| 2021/0255768 A1* | 8/2021 | Majerus | G06F 3/0635 |
| 2024/0087651 A1* | 3/2024 | Muchherla | G11C 29/028 |

FOREIGN PATENT DOCUMENTS

KR  101780280 B1  9/2017

* cited by examiner

*Primary Examiner* — Gautam Sain
*Assistant Examiner* — Wei Ma
(74) *Attorney, Agent, or Firm* — Myers Bigel, P.A.

(57) ABSTRACT

A memory device may include a time counter which is configured to output a count signal according to a predetermined time interval; a use history circuit which is configured to write an operating time value based on the count signal and generate and write a validation value corresponding to the operating time value; and a command decoder which is configured to receive an instruction from a memory controller. The instruction may be according to an operation mode that is determined based on the operating time value and the validation value.

20 Claims, 9 Drawing Sheets

MEMORY DEVICES AND METHODS FOR MANAGING USE HISTORY

CROSS-REFERENCE TO RELATED APPLICATION

This application claims priority to and the benefit of Korean Patent Application No. 10-2022-0151008, filed in the Korean Intellectual Property Office on Nov. 11, 2022, and the entire contents of the above-identified application are incorporated by reference herein.

BACKGROUND

(a) Field

The present disclosure relates to memory devices and to methods for managing use history.

(b) Description of the Related Art

Due to use of specified workloads, such as compression, encryption, and artificial intelligence, and the rapid increase in data capacity, demand is increasing for heterogeneous computing in which an accelerator developed for a special purpose operates together with a general purpose processor.

Such an accelerator may require or utilize a high performance connection with a processor, such that it is ideal for the accelerator and processor to share a memory space to reduce an overhead and latency. Therefore, studies have been performed on inter-chip connection protocols which maintain a memory and cache consistency by connecting the processor to various accelerators, and on reliability of memory devices used therefor.

SUMMARY

Some embodiments of the present disclosure provide methods for managing use history and memory devices using the same, which may improve a reliability of the memory devices.

According to some examples of embodiments, a memory device may include a time counter which is configured to output a count signal according to a predetermined time interval; a use history circuit which is configured to write an operating time value based on the count signal and generate and write a validation value corresponding to the operating time value; and a command decoder which is configured to receive an instruction from a memory controller. The instruction may be according to an operation mode that is determined based on the operating time value and the validation value.

The time counter may include a timer which is configured to output the count signal according to the predetermined time interval.

The time counter may be configured to output the count signal according to the predetermined time interval based on a clock signal.

The use history circuit may include a counter circuit which is configured to increase the operating time value when the count signal is received.

The memory device may further include an encryption circuit which is configured to encrypt the operating time value and the validation value, resulting in an encrypted operating time value and encrypted validation value, and the memory device may further include a decryption circuit which is configured to decrypt the encrypted operating time value and the encrypted validation value.

When the count signal is received, the use history circuit may be configured to decrypt the encrypted operating time using the decryption circuit and increase the decrypted operating time, thereby updating the operating time value, and the use history circuit may be configured to encrypt the updated operating time using the encryption circuit.

The use history circuit may be configured to update the validation value based on the updated operating time value and encrypt the updated validation value using the encryption circuit.

The memory device may further include a read only memory (ROM), which is configured to store an encryption code and a decryption code. The encryption circuit may be configured to encrypt the operating time value and the validation value using the encryption code, and the decryption circuit may be configured to decrypt the encrypted operating time value and the encrypted validation value using the decryption code.

The use history circuit may be configured to output the written operating time value and the written validation value in response to an operating time request command received from an external source.

The use history circuit may be configured to decrypt an encrypted written operating time value and encrypted written validation value prior to outputting the written operating time value and the written validation value.

The use history circuit may be configured to generate the validation value using the operating time value, a serial number, and a manufacturer code associated with the serial number.

According to some examples of embodiments, a memory device may include a command counter which is configured to output a count signal when a command is received; a use history circuit which is configured to write a number of processed commands based on the count signal and generate and write a validation value corresponding to the number of processed commands; and a command decoder which is configured to receive a first instruction from a memory controller. The first instruction may be according to an operation mode that is determined based on the number of processed commands and the validation value.

The received command may be at least one of a read command and a write command.

The command counter may be connected to the command decoder and the command decoder may be configured to decode a second instruction received from the memory controller to obtain and output the command to the command counter.

The memory device may further include: an encryption circuit which is configured to encrypt the number of processed commands and the validation value; and a decryption circuit which is configured to decrypt the encrypted number of processed commands and the encrypted validation value.

When the count signal is received, the use history circuit may be configured to decrypt the encrypted number of processed commands using the decryption circuit and increase the decrypted number of processed commands, thereby updating the number of processed commands, and the use history circuit may be configured to encrypt the updated number of processed commands using the encryption circuit.

The use history circuit may be configured to update the validation value based on the updated number of processed commands and encrypt the updated validation value using the encryption circuit.

The use history circuit may be configured to output the written number of processed commands and the written validation value in response to a request command for the number of processed commands received from an external source.

The use history circuit may be configured to generate the validation value using the number of processed commands, a serial number, and a manufacturer code associated with the serial number.

According to some examples of embodiments, a method for managing a use history of a memory device may include: obtaining a second use history by decrypting a stored first use history when a count signal is received; obtaining a third use history by updating the second use history; encrypting and storing the third use history; generating a validation value based on the third use history; and encrypting and storing the validation value, the third use history and the validation value are used to determine an operation mode of the memory device.

DETAILED DESCRIPTION

Figure 1:
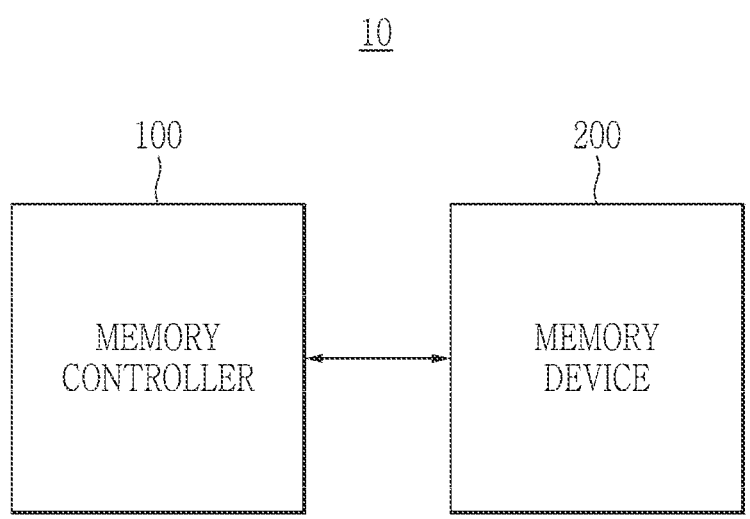
FIG. 1 is a schematic diagram of a memory system according to some examples of embodiments.

In the following detailed description, only some examples of embodiments of the present inventive concepts have been shown and described, simply by way of illustration. As those skilled in the art would realize, the described embodiments may be modified in various different ways, all without departing from the spirit or scope of the present inventive concepts.

Accordingly, the drawings and description are to be regarded as illustrative in nature and not restrictive. Like reference numerals designate like elements throughout the specification. In the flowchart described with reference to the drawing, an operation order may be changed, several operations may be combined, or any operation may be separated, and a specific operation may not be performed.

Further, an expression described in a singular form may be interpreted as a singular form or plural form unless an explicit expression such as "one" or "single" is used. Terms including ordinal numbers such as first or second may be used to describe various constituent elements, but the constituent element is not limited by the terms. These terms may be used to distinguish one constituent element from the other constituent element.

FIG. 1 is a schematic block diagram of a memory system according to some examples of embodiments.

Referring to FIG. 1, a memory system 10 includes a memory controller 100 and a memory device 200.

The memory controller 100 may control an overall operation of the memory system 10. The memory controller 100 may write data in the memory device 200 and/or read out data from the memory device 200 using a command and an address. For example, the memory controller 100 and the memory device 200 may be connected using an individual pin and an individual transmission line (or a plurality of pins and transmission lines) to exchange a command, an address, or data. According to some embodiments, the memory system 10 includes a plurality of memory devices 200 and the plurality of memory devices 200 communicates with the memory controller 100.

The memory controller 100 may control the memory device 200 in response to an instruction of the host (not shown). The host may request a data processing operation of the memory system 10, for example, a data reading operation, a data writing program operation, and/or a data erasing operation. For example, the host may be a central processing unit (CPU), a graphic processing unit (GPU), and a microprocessor, or an application processor (AP).

The host may communicate with the memory controller 100 using an interface protocol such as a peripheral component interconnect express (PCIe), an advanced technology attachment (ATA), serial ATA (SATA), parallel ATA (PATA), serial attached SCSI (SAS), or compute eXpress link (CXL). Further, the interface protocol between the host and the memory controller 100 is not limited to the above-described examples and may be implemented by any one of a number of interface protocols, such as a universal serial bus (USB), a multi-media card (MMC), an enhanced small disk interface (ESDI), or integrated drive electronics (IDE), as non-limiting examples.

The memory device 200 may be a volatile memory or a non-volatile memory.

For example, the memory device 200 may be a dynamic random access memory (DRAM) such as a double data rate synchronous dynamic random access memory (DDR SDRAM), a lower power double data rate (LPDDR) SDRAM, graphics double data rate (GDDR) SDRAM, lower power DDR (LPDDR), or a Rambus dynamic random access memory (RDRAM).

As another example, the memory device 200 may be a static random access memory (SRAM), a NAND flash memory, a vertical NAND (VNAND) flash memory, a bonding vertical NAND (BVNAND) flash memory, a NOR flash memory, a resistive random access memory (RRAIVI), a phase-change RAM (PRAM), a magneto resistive RAM (MRAM), a ferroelectric RAM (FRAM), a spinimplant spin transfer torque RAM (STT-RAM), or a conductive bridging RAM (CBRAM).

The memory device 200 may generate a use history. The use history may be about a time (e.g., operating time) or a command. For example, the memory device 200 may count and store at least one of an operating time of the memory device 200 and/or a number of commands processed by the and memory device 200. The memory device 200 may encrypt and store the use history.

The memory device 200 may transmit the use history to the memory controller 100. The memory device 200 may decrypt (or decode) the encrypted use history to provide the decrypted use history to the memory controller 100. The memory controller 100 may determine and/or set a level of the memory device 200 based on the use history of the memory device 200. For example, if the operating time of the memory device 200 is relatively short or a number of processed commands is relatively small, the memory controller 100 may determine or set the level of the memory device 200 as a first level. If the operating time of the memory device 200 is relatively long or a number of processed commands is relatively large, the memory controller 100 may determine or set the level of the memory device 200 as a second level. The first level may be higher than the second level.

The memory controller 100 may determine an operation mode of the memory device 200 according to the determined or set level of the memory device 200. For example, if the level of the memory device 200 is high (e.g., the first level), the memory controller 100 may use the memory device 200 as a memory for an accelerator, since use as an accelerator may require a relatively faster speed. If the level of the memory device 200 is low (e.g., the second level), the memory controller 100 may use the memory device 200 as a memory for storing (or storage memory), since use as a storage memory may require relatively higher reliability. The memory controller 100 may perform more refresh (e.g., a greater number of refresh operations) in a memory device 200 having a low level than in a memory device 200 having a high level.

The memory device 200 may generate a validation value. For example, the memory device 200 may generate a validation value according to the use history. The memory device 200 may encrypt and store the validation value. The memory device 200 may decrypt the encrypted validation value and may provide the decrypted validation value to the memory controller 100.

The memory controller 100 may also generate a validation value for the memory device 200 based on the decrypted use history. The memory controller 100 may determine or compare whether the validation value (or a restored value) generated by the memory controller 100 based on the decrypted use history matches with the decrypted verification value provided by the memory device 200. If it is determined that the validation values match, the memory controller 100 may determine or set the level of the memory device 200 based on the decrypted use history. If it is determined that the validation values do not match, the memory controller 100 may determine or set the level of the memory device 200 to a lowest level. For example, the memory controller 100 may use memory devices 200 determined or set to have the lowest level as a storing memory. According to some embodiments, an operation of determining a level and an operation mode of the memory device 200 may be performed by another element outside the memory device 200. In some instances, where the validation values do not match, it may indicated that there has been a hacking attempt.

Figure 2:
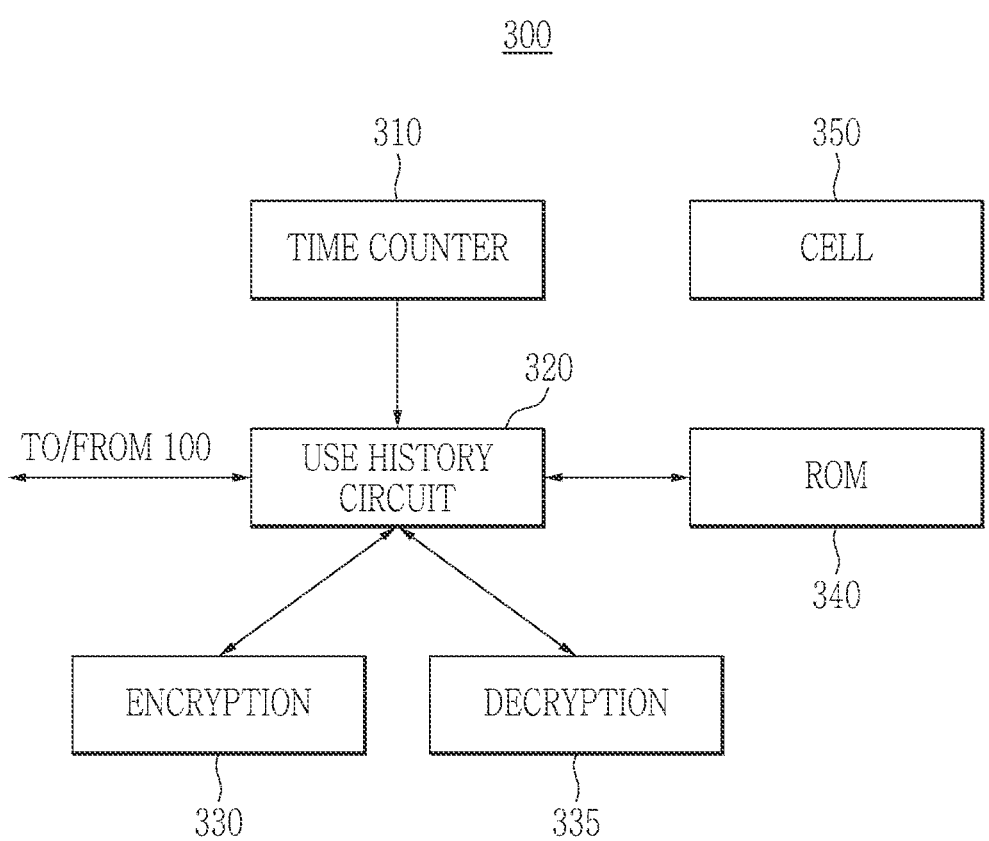
FIG. 2 is a schematic block diagram of a memory device according to some examples of embodiments.

FIG. 2 is a schematic block diagram of a memory device according to some examples of embodiments.

Referring to FIG. 2, a memory device 300 according to some examples of embodiments may manage a use history about time (e.g., operation time), and may include a time counter 310, a use history circuit (odometer) 320, an encryption circuit 330, a decryption circuit 335, a read only memory (ROM) 340, and a cell 350. The use history about the time may refer to an operating time of the memory device 300. The memory device 300 may be used as the memory device 200 of FIG. 1.

The time counter 310 may output a count signal to the use history circuit 320 in a predetermined time interval. In some embodiments, the time counter 310 may output a count signal in a time interval which is determined in advance (or predetermined) using a timer. In some embodiments, the time counter 310 may output a count signal in a predetermined time interval based on a clock signal. The time counter 310 may receive the clock signal from the memory controller 100 or use a clock signal which is internally generated by the memory device 300. For example, when the clock signal is toggled a predetermined number of times (e.g., as many as the predetermined number of times), the time counter 310 may output the count signal.

The use history circuit 320 may manage an operating time based on the count signal of the time counter 310. For example, the use history circuit 320 may include a counter circuit and may increase the counter circuit in response to the count signal. A value of the counter circuit represents an operating time. Incrementing the value of the counter circuit by one may indicate an increase of one unit in the operating time of the memory device 300.

The use history circuit 320 may encrypt and store the operating time. For example, the use history circuit 320 may be implemented as a non-volatile memory. The use history circuit 320 may encrypt the operating time using the encryption circuit 330. The use history circuit 320 may transmit the encryption code stored in the ROM 340 to the encryption circuit 330. According to some embodiments, the encryption circuit 330 may directly use the encryption code stored in the ROM 340. For example, the encryption circuit 330 may use a Rivest Shamir Adleman (RSA) algorithm or a Caesar cipher algorithm.

When the use history circuit 320 receives a count signal from the time counter 310, the use history circuit may decrypt the encrypted and stored operating time. The use history circuit 320 may decrypt the encrypted operating time using the decryption circuit 335. The use history circuit 320 may transmit the decryption code stored in the ROM 340 to the decryption circuit 335. According to some embodiments, the decryption circuit 335 may directly use the decryption code stored in the ROM 340. Each memory device 300 may have a different encryption code and decryption code stored in the ROM 340 therein. The use history circuit 320 may increase the decrypted operating time by one (e.g., one unit) in response to the count signal. The use history circuit 320 may again encrypt and store the updated operating time using the encryption circuit 330.

Further, when the use history circuit 320 receives an operating time request command from the memory controller 100, the use history circuit 320 may decrypt the encrypted and stored operating time. The use history circuit 320 may decrypt the encrypted operating time using the decryption circuit 335. The use history circuit 320 may transmit the decryption code stored in the ROM 340 to the decryption circuit 335. According to some embodiments, the decryption circuit 335 may directly use the decryption code stored in the ROM 340. The use history circuit 320 may transmit the decrypted operating time to the memory controller 100. The memory controller 100 may determine or set a level of the memory device 300 based on the operating time. The memory controller 100 may determine an operation mode of the memory device 300 according to the determined or set level of the memory device 300.

The use history circuit 320 may generate a validation value based on the operating time. For example, the use history circuit 320 may generate the validation value using the operating time, a serial number, and a code. A manufacturer may assign a one-to-one corresponding (or respective) serial number to every use history circuit of memory devices 300 and may generate and manage a code table for the code, which may be generated according to the serial number.

In some embodiments, the use history circuit 320 may generate a validation value using Equation 1.

$$\text{Validation} = (\text{counter} + \text{serial number})\% \text{ code} \qquad \text{(Equation 1)}$$

Here, Validation represents a validation value, the counter represents a value of the counter circuit (that is, an indicator of the operating time of the memory device 300) of the use history circuit 320, the serial number represents a number which respectively corresponds to the use history circuit 320, the code is associated with the serial number and is determined in advance by the manufacturer of the memory device 300, and % may represent a remainder operation (that is, a modular operation).

In some embodiments, the use history circuit 320 may generate a validation value using Equation 2.

$$\text{Validation} = (\text{counter} + f(\text{serial number}))\% \text{ code} \qquad \text{(Equation 2)}$$

Here, Validation represents a validation value, the counter represents a value of the counter circuit (that is, an indicator of the operating time of the memory device 300) of the use history circuit 320, the serial number represents a number which respectively corresponds to the use history circuit 320, f represents a function for transforming a serial number, the code is associated with the serial number and is determined in advance by the manufacturer of the memory device 300, and % may represent a remainder operation. For example, the function f may be a function which converts a serial number into bits and then shuffles it.

In some embodiments, the use history circuit 320 may generate the validation value using Equation 3.

$$\text{Validation} = (f1(\text{counter}) + f2(\text{serial number}))\% \text{ code} \qquad \text{(Equation 3)}$$

Here, Validation represents a validation value, the counter represents a value of the counter circuit (that is, an indicator of the operating time of the memory device 300) of the use history circuit 320, the serial number represents a number which respectively corresponds to the use history circuit 320, f1 represents a function for transforming the value of the counter circuit and f2 represents a function for transforming the serial number, the code is associated with the serial number and is determined in advance by the manufacturer of the memory device 300, and % may represent a remainder operation.

The use history circuit 320 may encrypt and store the validation value. The use history circuit 320 may encrypt the validation value using the encryption circuit 330. The use history circuit 320 may transmit the encryption code stored in the ROM 340 to the encryption circuit 330. According to some embodiments, the encryption circuit 330 may directly use the encryption code stored in the ROM 340. For example, the encryption circuit 330 may use the RSA algorithm and Caesar cipher algorithm.

When the use history circuit 320 receives a validation value request command from the memory controller 100, the use history circuit may decrypt the encrypted and stored validation value. The use history circuit 320 may decrypt the encrypted validation value using the decryption circuit 335. The use history circuit 320 may transmit the decryption code stored in the ROM 340 to the decryption circuit 335. According to some embodiments, the decryption circuit 335 may directly use the decryption code stored in the ROM 340. The use history circuit 320 may transmit the decrypted validation value to the memory controller 100.

The memory controller 100 may calculate the validation value using the decrypted operating time. The memory controller 100 may calculate the validation value using a method (e.g., one of Equations 1-3) used by the use history circuit 320 to generate the validation value. The memory controller 100 may determine or compare whether the validation value calculated by the memory controller 100 matches with the decrypted validation value received from the use history circuit 320. If it is determined that the validation values match, the memory controller 100 may determine or set the level of the memory device 300 based on the decrypted operating time. If it is determined that the validation values do not match, the memory controller 100 may determine or set the level of the memory device 300 as a lowest level. When the validation values do not match, it may indicate that there has been a hacking attempt.

The cell 350 may perform refresh operations, store operations (e.g., writes), transmit operations (e.g., reads), and/or erase operations on data according to the commands of the memory controller 100. The cell 350 may operate separately from the time counter 310 and the use history circuit 320.

In FIG. 2, it is illustrated that the memory device 300 has a time counter 310, a use history circuit 320, an encryption circuit 330, a decryption circuit 335, a ROM 340, and a cell 350, but it and the present disclosure are not limited thereto. Therefore, it should be understood that the memory device 300 may include a command decoder, a row decoder, a column decoder, and a refresh circuit for the operation of the cell 350, which are not shown in FIG. 2. For example, the command decoder may receive an instruction from a memory controller (e.g., memory controller 100 of FIG. 1), where the instruction is according to an operation mode that is determined by the memory controller based on the operating time and the validation value of the memory device 300.

Figure 3:
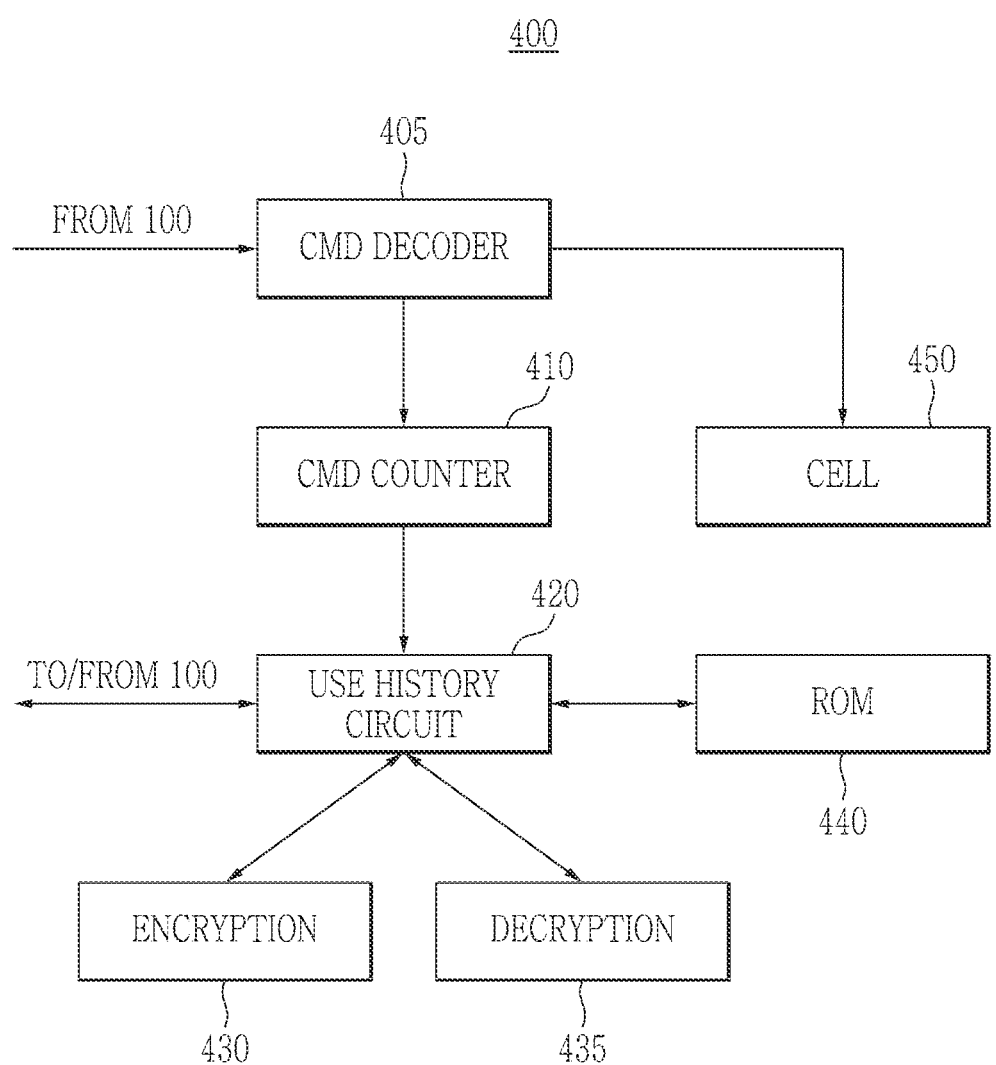
FIG. 3 is a schematic block diagram of a memory device according to some examples of embodiments.

FIG. 3 is a schematic block diagram of a memory device according to some examples of embodiments.

Referring to FIG. 3, a memory device 400 according to some embodiments may manage a use history about commands, and may include a command decoder 405, a command counter 410, a use history circuit 420, an encryption circuit 430, a decryption circuit 435, a ROM 440, and a cell 450. The use history about commands may refer to a number of commands processed by the memory device 400 (hereinafter, referred to as a processed command number). The memory device 400 may be used as the memory device 200 of FIG. 1.

The command decoder 405 may decode the command received from the memory controller 100. For example, the command may include one or more of a chip selection signal, a clock enable signal, an address strobe signal, a refresh signal, a data read-out signal, a data write signal, and a data erase signal, but the present disclosure is not limited thereto. The memory device 400 may operate with respect to the cell 450 according to the command which is decoded by the command decoder 405, and to this end, the memory device 400 may further include a row decoder, a column decoder, and a refresh circuit (not shown in FIG. 4). The command decoder 405 may output the decoded command to the command counter 410.

If the decoded command is a read command or a write command (or includes at least one of a read command or a write command), the command counter 410 may output the count signal to the use history circuit 420. In some embodiments, the command counter 410 is configured to output the count signal when the command counter receives the read command. In some embodiments, the command counter 410 is configured to output the count signal when the command counter receives the write command. In some embodiments, the command counter is configured to output the count signal when the command counter receives the read command or the write command.

The use history circuit 420 may manage the processed command number based on the count signal of the command counter 410. For example, the use history circuit 420 may include a counter circuit and may increase the counter circuit in response to the count signal. The value of the counter circuit may represent the processed command number. Incrementing the value of the counter circuit by one may indicate an additional performance of one or more commands (e.g., read commands, write commands) by the memory device 400.

The use history circuit 420 may encrypt and store the processed command number. For example, the use history circuit 420 may be implemented by a non-volatile memory. The use history circuit 420 may encrypt the processed command number using the encryption circuit 430. The use history circuit 420 may transmit the encryption code stored in the ROM 440 to the encryption circuit 430. According to some embodiments, the encryption circuit 430 may directly use the encryption code stored in the ROM 440. For example, the encryption circuit 430 uses a Rivest Shamir Adleman (RSA) algorithm or a Caesar cipher algorithm.

When the use history circuit 420 receives a count signal from the command counter 410, the use history circuit may decrypt the encrypted and stored processed command number. The use history circuit 420 may decrypt the encrypted processed command number using the decryption circuit 435. The use history circuit 420 may transmit the decryption code stored in the ROM 440 to the decryption circuit 435. According to some embodiments, the decryption circuit 435 may directly use the decryption code stored in the ROM 440. Each memory device 400 may have a different encryption code and decryption code stored in the ROM 440 therein. The use history circuit 420 may increase the decrypted processed command number by one in response to the count signal. The use history circuit 420 may again encrypt and store the updated processed command number using the encryption circuit 430.

Further, when the use history circuit 420 receives a processed command number request command from the memory controller 100, the use history circuit 420 may decrypt the encrypted and stored processed command number. The use history circuit 420 may decrypt the encrypted processed command number using the decryption circuit 435. The use history circuit 420 may transmit the decryption code stored in the ROM 440 to the decryption circuit 435. According to some embodiments, the decryption circuit 435 may directly use the decryption code stored in the ROM 440. The use history circuit 420 may transmit the decrypted processed command number to the memory controller 100. The memory controller 100 may determine or set a level of the memory device 400 based on the processed command number. The memory controller 100 may determine an operation mode of the memory device 400 according to the level of the memory device 400.

The use history circuit 420 may generate a validation value based on the processed command number. For example, the use history circuit 420 may generate the validation value using the processed command number, a serial number, and a code.

In some embodiments, the use history circuit 420 may generate a validation value using Equation 4.

$$\text{Validation} = (\text{counter} + \text{serial number})\% \text{ code} \quad \text{(Equation 4)}$$

Here, Validation represents a validation value, the counter represents a value of the counter circuit (that is, an indicator of the processed command number of the memory device 400) of the use history circuit 420, the serial number represents a number which respectively corresponds to the use history circuit 420, the code is associated with the serial number and is determined in advance by the manufacturer of the memory device 400, and % may represent a remainder operation.

In some embodiments, the use history circuit 420 generates a validation value using Equation 5.

$$\text{Validation} = (\text{counter} + f(\text{serial number}))\% \text{ code} \quad \text{(Equation 5)}$$

Here, Validation represents a validation value, the counter represents a value of the counter circuit (that is, an indicator of the processed command number of the memory device 400) of the use history circuit 420, the serial number represents a number which respectively corresponds to the use history circuit 420, f represents a function for transforming a serial number, the code is associated with the serial number and is determined in advance by the manufacturer of the memory device 400, and % may represent a remainder operation. For example, the function f may be a function which converts a serial number into bits and then shuffles it.

In some embodiments, the use history circuit 420 generates the validation value using Equation 6.

$$\text{Validation} = (f1(\text{counter}) + f2(\text{serial number}))\% \text{ code} \quad \text{(Equation 6)}$$

Here, Validation represents a validation value, the counter represents a value of the counter circuit (that is, an indicator of the processed command number of the memory device 400) of the use history circuit 420, the serial number represents a number which respectively corresponds to the use history circuit 420, f1 represents a function for transforming the value of the counter circuit and f2 represents a function for transforming the serial number, the code is associated with the serial number and is determined in advance by the manufacturer of the memory device 400, and % may represent a remainder operation.

The use history circuit 420 may encrypt and store the validation value. The use history circuit 420 may encrypt the validation value using the encryption circuit 430. The use history circuit 420 may transmit the encryption code stored in the ROM 440 to the encryption circuit 430. According to some embodiments, the encryption circuit 430 may directly use the encryption code stored in the ROM 440. For example, the encryption circuit 430 may use the RSA algorithm and Caesar cipher algorithm.

When the use history circuit 420 receives a validation value request command from the memory controller 100, the use history circuit may decrypt the encrypted and stored validation value. The use history circuit 420 may decrypt the encrypted validation value using the decryption circuit 435. The use history circuit 420 may transmit the decryption code stored in the ROM 440 to the decryption circuit 435. According to some embodiments, the decryption circuit 435 may directly use the decryption code stored in the ROM 440. The use history circuit 420 may transmit the decrypted validation value to the memory controller 100.

The memory controller 100 may calculate a validation value using the decrypted processed command number. The memory controller 100 may calculate the validation value using a method (e.g., one of Equations 4-6) used by the use history circuit 420 to generate the validation value. The memory controller 100 may determine or compare whether the validation value calculated by the memory controller 100 matches with the decrypted validation value received from the use history circuit 420. If it is determined that the validation values match, the memory controller 100 may determine or set the level of the memory device 400 based on the decrypted processed command number. If it is determined that the validation values do not match, the memory controller 100 may determine or set the level of the memory device 400 as a lowest level. When the validation values do not match, it may indicate that there has been a hacking attempt.

The cell 450 may perform refresh operations, store operations, transmit operations, and/or erase operations on data according to the commands of the memory controller 100. In some embodiments, the command decoder 405 may receive an instruction from a memory controller (e.g., memory controller 100 of FIG. 1), where the instruction is according to an operation mode that is determined by the memory controller based on the number of processed commands and the validation value of the memory device 400.

Figure 4:
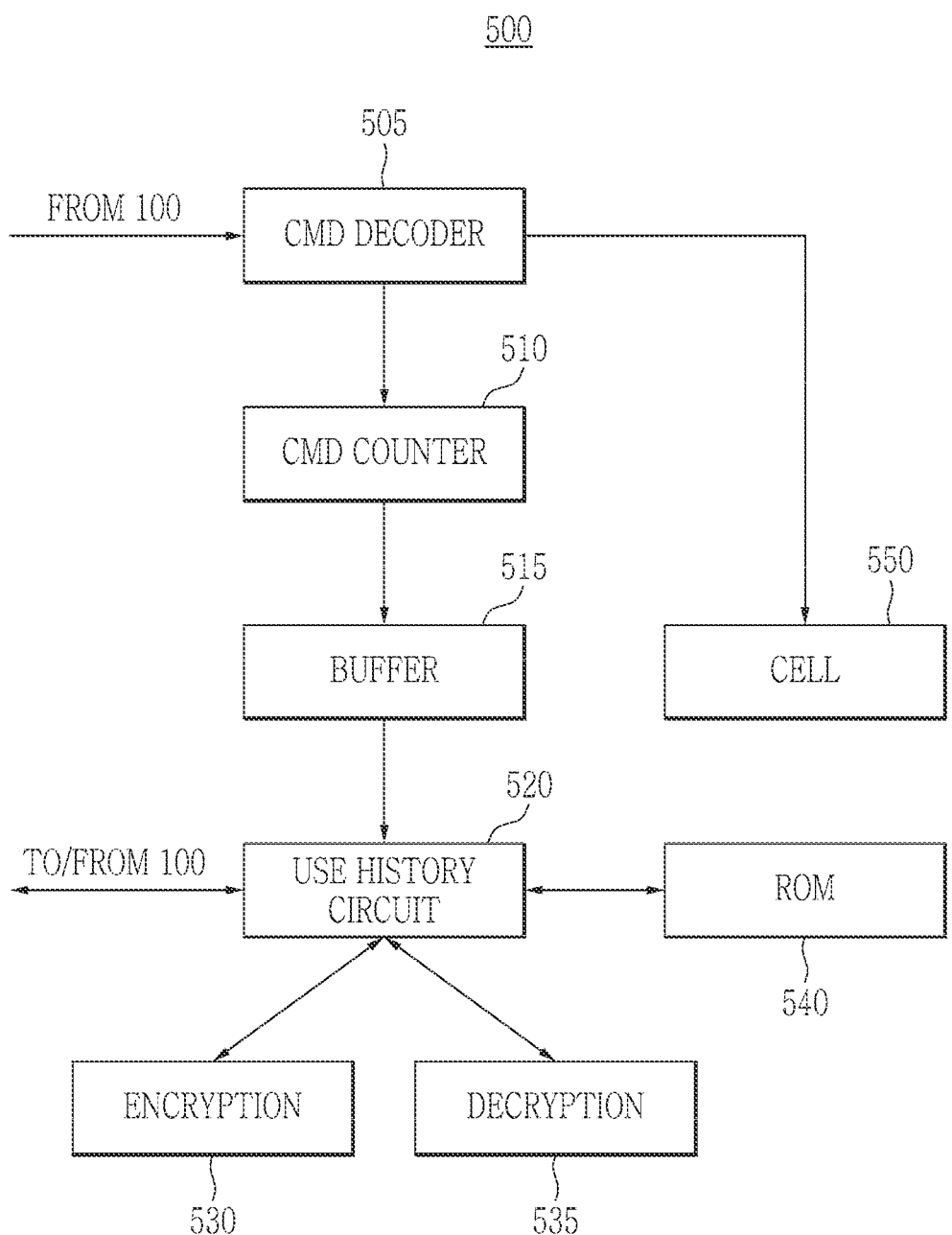
FIG. 4 is a schematic block diagram of a memory device according to some examples of embodiments.

FIG. 4 is a schematic block diagram of a memory device according to some examples of embodiments.

Referring to FIG. 4, a memory device 500 according to some embodiments may manage a use history about commands, and may include a command decoder 505, a command counter 510, a buffer 515, a use history circuit 520, an encryption circuit 530, a decryption circuit 535, a ROM 540, and a cell 550. The use history about commands may refer to a number of commands processed by the memory device 500 (hereinafter, referred to as a processed command number). The memory device 500 may be used as the memory device 200 of FIG. 1.

The same description of the command decoder 405, the command counter 410, the user history circuit 420, the encryption circuit 430, the decryption circuit 435, the ROM 440, and the cell 450 of FIG. 3 may be applied in the same way to the command decoder 505, the command counter 510, the user history circuit 520, the encryption circuit 530, the decryption circuit 535, the ROM 540, and the cell 550 of FIG. 4. Accordingly, in FIG. 4, the buffer 515 and the command counter 510 and the use history circuit 520 connected to the buffer 515 will be mainly described.

If a command decoded by the command decoder 505 is at least one of a read command and a write command, the command counter 510 outputs a first count signal to the buffer 515. In some embodiments, the command counter 510 is configured to output a first count signal when the command counter receives the read command. In some embodiments, the command counter 510 is configured to output the first count signal when the command counter receives the write command. In some embodiments, the command counter is configured to output the first count signal when the command counter receives the read command or the write command.

If the buffer 515 receives a predetermined number of first count signals, the use history circuit 520 may output a second count signal. For example, the predetermined number may be implemented as 100, 1000, or 10000, but is not necessarily limited thereto.

The use history circuit 520 may manage the processed command number based on the second count signal. For example, the use history circuit 520 may include a counter circuit and may increase the counter circuit in response to the second count signal. A value obtained by multiplying a value of the counter circuit with a predetermined number (e.g., the predetermined number used by the buffer 515) may represent a processed command number. The same description for the use history circuit 420 of FIG. 3 may be applied in the same way to the configuration of the use history circuit 520 of FIG. 4 for generating, encrypting, storing, and decrypting the processed command number and the validation value.

Figure 5:
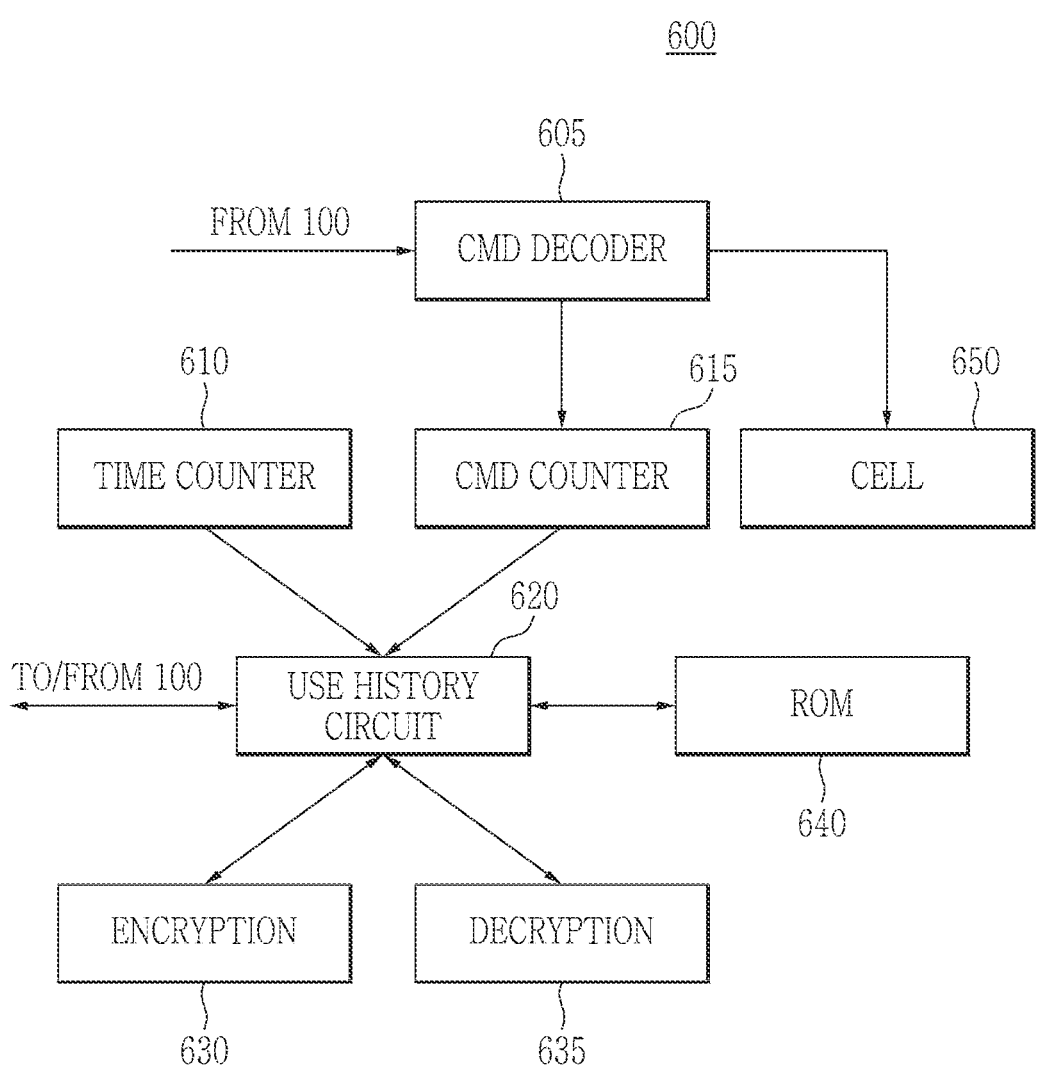
FIG. 5 is a schematic block diagram of a memory device according to some examples of embodiments.

FIG. 5 is a schematic block diagram of a memory device according to some examples of embodiments.

Referring to FIG. 5, a memory device 600 according to some embodiments may manage a use history and may include a command decoder 605, a time counter 610, a command counter 615, a use history circuit 620, an encryption circuit 630, a decryption circuit 635, a ROM 640, and a cell 650. The use history may include an operating time and a processed command number. The memory device 600 may be used as the memory device 200 of FIG. 1.

The description of the command decoder 405, the command counter 410, the encryption circuit 430, the decryption circuit 435, the ROM 440, and the cell 450 of FIG. 3 may be applied in the same way to the command decoder 605, the command counter 615, the encryption circuit 630, the decryption circuit 635, the ROM 640, and the cell 650 of FIG. 5. Further, the description of the time counter 310 of FIG. 2 may be applied in the same way to the description of the time counter 610 of FIG. 5.

Accordingly, in FIG. 5, the use history circuit 620 and the time counter 610 and the command counter 615 connected to the use history circuit 620 will be mainly described. The use history circuit 620 may manage an operating time, a first validation value for the operating time, a processed command number, and a second validation value for the processed command number. The use history circuit 620 may include a first counter circuit for managing the operating time and a second counter circuit for managing a processed command number.

The time counter 610 may output a third count signal to the use history circuit 620 in a predetermined time interval. In some embodiments, the time counter 610 may output the third count signal in a predetermined time interval using a timer. In some embodiments, the time counter 610 may output the third count signal in a predetermined time interval based on a clock signal. The time counter 610 may receive a clock signal from the memory controller 100 or use a clock signal which is internally generated by the memory device 600. For example, when the clock signal is toggled a predetermined number of times (e.g., as many as a predetermined number of times), the time counter 610 may output the count signal.

The use history circuit 620 may manage an operating time based on the third count signal of the time counter 610. For example, the use history circuit 620 may increase the first counter circuit in response to the third count signal. A value of the first counter circuit represents an operating time. Incrementing the value of the first counter circuit by one may indicate an increase of one unit in the operating time of the memory device 300.

If a command decoded by the command decoder 605 is at least one of a read command and a write command, the command counter 615 may output a fourth count signal to the use history circuit 620. In some embodiments, the command counter 615 is configured to output the fourth count signal when the command counter receives the read command. In some embodiments, the command counter 615 is configured to output the fourth count signal when the command counter receives the write command. In some embodiments, the command counter 615 is configured to output the fourth count signal when the command counter receives the read command or the write command.

The use history circuit 620 may manage the processed command number based on the fourth count signal of the command counter 615. For example, the use history circuit 620 may increase the second counter circuit in response to the fourth count signal. The value of the second counter circuit may represent the processed command number. Incrementing the value of the second counter circuit by one may indicate an additional performance of one or more commands (e.g., read commands, write commands) by the memory device 400.

According to some embodiments, the memory device 600 may be implemented to further include a buffer between the command counter 615 and the use history circuit 620. The buffer may be similar to the buffer 515 of FIG. 4, and may be configured to output a fifth count signal to the user history circuit 620 when a predetermined number of fourth count signals from the command counter 615 is received. The use history circuit 620 may increase the second counter circuit in response to the fifth count signal.

The use history circuit 620 may encrypt and store the operating time and the processed command number.

The use history circuit 620 may generate a first validation value based on the operating time and generate a second validation value based on the processed command number. The use history circuit 620 may generate the first validation value and the second validation value using at least one of the above-described Equations 1 to 6.

The use history circuit 620 may encrypt and store the first validation value and the second validation value.

The use history circuit 620 may encrypt or decrypt the operating time, the processed command number, the first verification value, and the second verification value using the encryption circuit 630 and the decryption circuit 635. When the encryption circuit 630 performs the encryption, an encryption code stored in the ROM 640 may be used. When the decryption circuit 635 performs the decryption, a decryption code stored in the ROM 640 may be used.

Figure 6:
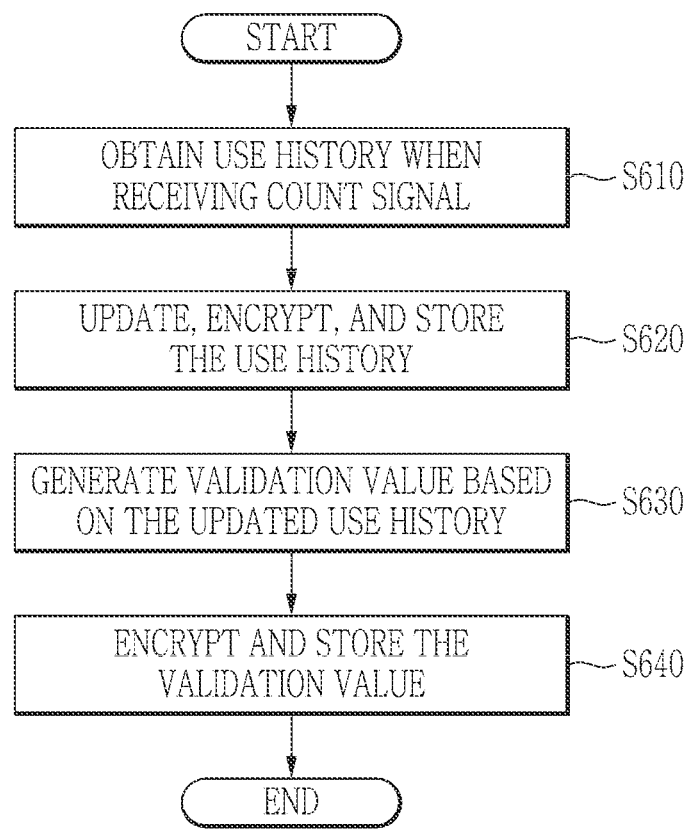
FIG. 6 is a flowchart of a method for managing use history according to some examples of embodiments.

FIG. 6 illustrates a flowchart of a method for managing a use history according to some examples of embodiments.

Referring to FIG. 6, the method for managing a use history according to some embodiments may be applied to the memory device. The memory device may include a use history circuit which manages the use history.

When the use history circuit according to some embodiments receives a count signal, the use history circuit may obtain the use history in step S610. The use history circuit may encrypt and store the use history. When the use history circuit receives the count signal, the use history circuit may decrypt the encrypted and stored use history to obtain the use history. The use history circuit may perform the encryption and the decryption using the encryption circuit and the decryption circuit. The use history circuit may use an encryption code and a decryption code stored in the ROM of the memory device. The use history may be at least one of the operating time of the memory device and a number of commands processed by the memory device. When the use history is the operating time, the use history circuit may receive a count signal in a predetermined time interval. When the use history is a processed command number, the use history circuit may receive the count signal based on commands received from the memory controller. For example, when the command received from the memory controller is at least one of the read command and the write command, the use history circuit may receive a count signal. The count signal may indicate one or more units of operating time and/or one or more commands have been performed by the memory device.

The use history circuit may update, encrypt, and store the decrypted use history in step S620. The use history circuit may update the decrypted use history by increasing a value of the counter circuit by 1. The use history circuit may encrypt and store again the updated use history.

The use history circuit may generate the validation value based on the updated use history S630. For example, the use history circuit may generate the validation value using the updated use history, a serial number of the use history circuit, and a manufacturer code associated with the serial number. A manufacturer may assigns a one-to-one corresponding (e.g., respectively corresponding) serial number to every use history circuit of the memory devices, and may generate and manage a code table for the code which is generated according to the serial number.

The use history circuit may encrypt and store the validation value in step S640. An encryption algorithm used to encrypt the use history and an encryption algorithm used to encrypt the validation value may be the same, or may be different. The use history and the validation value may be used to determine an operation mode of the memory device by another element outside the memory device.

Figure 7:
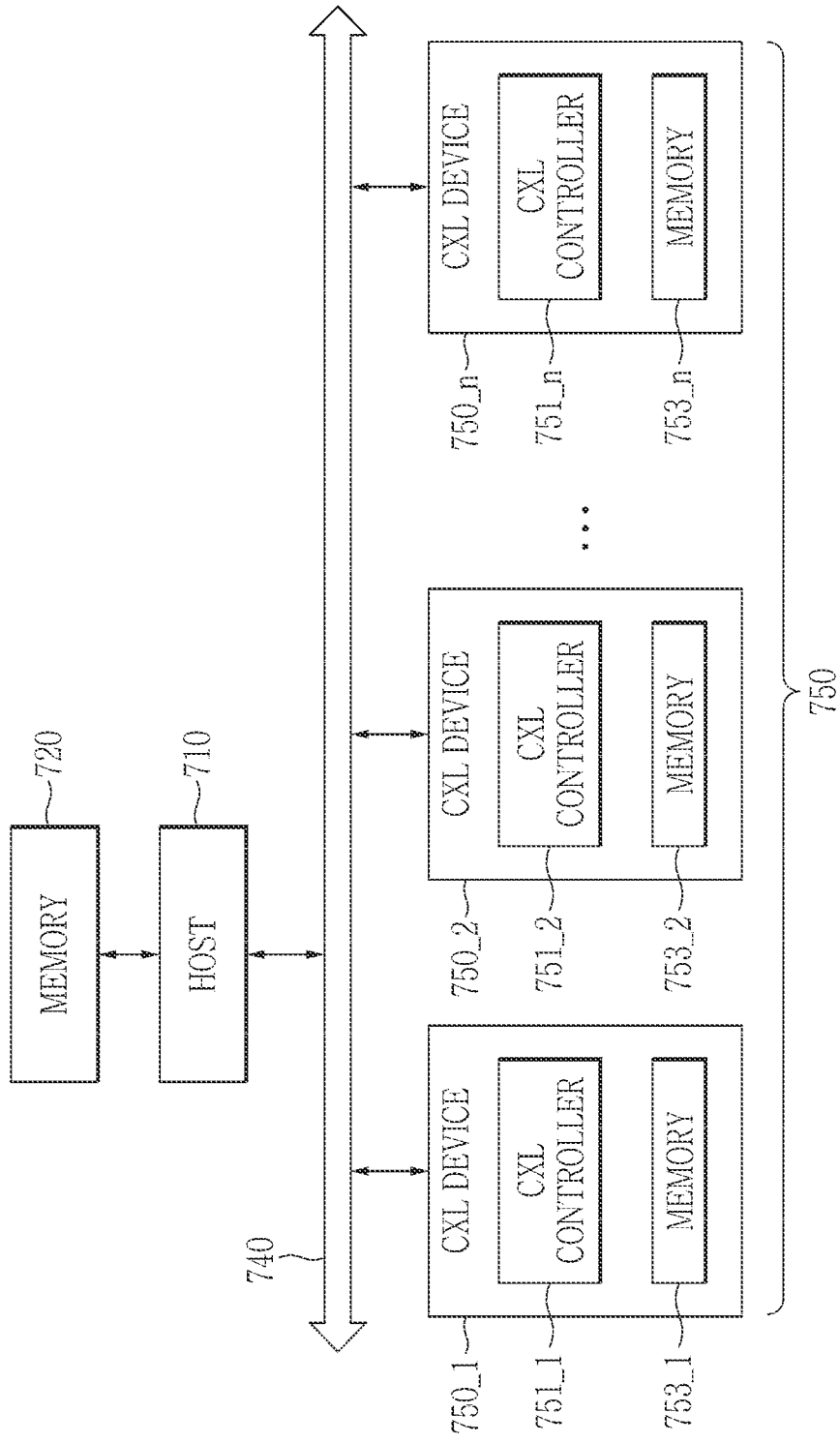
FIG. 7 is a block diagram illustrating a computer system according to some examples of embodiments.

FIG. 7 is a block diagram illustrating a computer system according to some examples of embodiments.

Referring to FIG. 7, the computer system 700 includes a host 710, a memory 720, at least one compute eXpress link (CXL) device 750, and a CXL interface 740. At least one CXL device 750 includes first to n-th CXL devices (750_1-750_n; n is a natural number of 1 or larger). In some embodiments, the computer system 700 may be included in user devices such as a personal computer (PC), a laptop computer, a server, a media player, or a digital camera, or an automotive device such as a navigation, a black box, or an automotive electronic device. In some embodiments, the computer system 700 may be a mobile system such as a portable communication terminal (mobile phone), a smart phone, a tablet personal computer (tablet PC), a wearable device, a healthcare device, or an internet of things (IOT) device.

The host 710 may control the overall operation of the computer system 700. In some embodiments, the host 710 may one of various processors such as a central processing unit (CPU), a graphics processing unit (GPU), a neural processing unit (NPU), or a data processing unit (DPU). In some embodiments, the host 710 may include a signal core processor or a multi-core processor.

In some embodiments, at least one CXL device 750 operates as a cache buffer of the host 710. That is, the host 710 may use the memories 753_1 to 753_n of at least one of the CXL device 750 as a cache buffer.

The host 710 may generate a signal for at least one CXL device 750 and/or the memory 720. The signal may include a command and an address. In some embodiments, commands may include commands such as write commands or read commands. In some embodiments, the command may include activation instructions, and read/write instructions. In some embodiments, the command may further include a precharge instruction.

An activation instruction may be an instruction which switches a target row of the memories 753_1 to 753_n of at least one CXL device 750 to an active state to write data in at least one CXL device 750 or read data from the at least one CXL device 750. Alternatively, the activation instruction may be an instruction which switches the target row in the memory 720 to an active state to write data in the memory 720 or read data from the memory 720. The at least one CXL device 750 and/or the memory 720 may activate (for example, drive) a memory cell of the target row in response to the activation instruction. The read/write instruction may be an instruction which performs a read or write operation in the target memory cell of the row which is switched to the active state.

The memory 720 may be used as a main memory or a system memory of the computer system 700. In some embodiments, the memory 720 may be a dynamic random access memory (DRAM) device or may have a form factor of a dual in-line memory module (DIMM). However, the present disclosure is not limited thereto and the memory 720 may include a non-volatile memory such as a flash memory, a PRAM, a RRAM, or an MRAM.

In some embodiments, the host 710 may be directly connected to the memory 720. In some embodiments, the memory 720 may communicate directly with the host 710 via a DDR interface. In some embodiments, the host 710 may include a memory controller configured to control the memory 720. However, the present disclosure is not limited thereto and the memory 720 may communicate with the host 710 via various interfaces.

The at least one CXL device 750 may include CXL controllers 751_1 to 751_n and memories 753_1 to 753_n. Each CXL device 750 may include a respective CXL controller 751 and memory 753. In some embodiments, the memories 753_1 to 753_n may operate as cache buffers of at least one CXL device 750. That is, at least one CXL device 750 may use each memory 753_1 to 753_n as a cache buffer.

The CXL controllers 751_1 to 751_n may include an intellectual property (IP) circuit designed to implement an application specific integrated circuit (ASIC) and/or a field programmable gate array (FPGA). In some embodiments, the CXL controllers 751_1 to 751_n may be implemented to support the CXL protocol (for example, a CXL 2.0 protocol or other arbitrary version). The CXL controller 751_1 to 751_n may convert CXL packets and signals of the memory interface of the memory 720.

In some embodiments, at least one CXL device 750 may be implemented by an individual memory device or memory module. At least one CXL device 750 may be connected to the CXL interface 740 through different physical ports. That is, at least one CXL device 750 is connected to the CXL interface 740 so that a memory area managed by the host 710 may be highly capacitive and/or has a large capacity.

The memories 753_1 to 753_n may include one of a dynamic random access memory (DRAM), a Not-AND NAND flash, a high bandwidth memory (HBM), a hybrid memory cube (HMC), a dual in-line memory module (DIMM), an optane DIMM, a non-volatile DIMM (NVMDIMM), a double data Rate synchronous DRAM (DDR SDRAM), or a low power double data rate synchronous dynamic random access memory (LPDDR SDRAM), or a combination thereof.

In some embodiments, the host 710 and at least one CXL device 750 may be configured to share the same interface. For example, the host 710 and at least one CXL device 750 may communicate with each other via the CXL interface 740. In some embodiments, the CXL interface (compute link interface) 740 may indicate a low latency and high bandwidth link which supports the coherency, memory access, and dynamic protocol multiplexing of the input/output protocol (10 protocol) to enable various connections between accelerators, memory devices, and various electronic devices.

In FIG. 7, even though it has been described that the host 710 and the at least one CXL device 750 communicate with each other via the CXL interface 740, the present disclosure is not necessarily limited thereto. For example, the host 710 and at least one CXL device 750 may communicate with each other based on various computing interfaces, such as a GEN-Z protocol, a NVLink protocol, a CCIX protocol, or an open CAPI protocol, as non-limiting examples.

Figure 8:
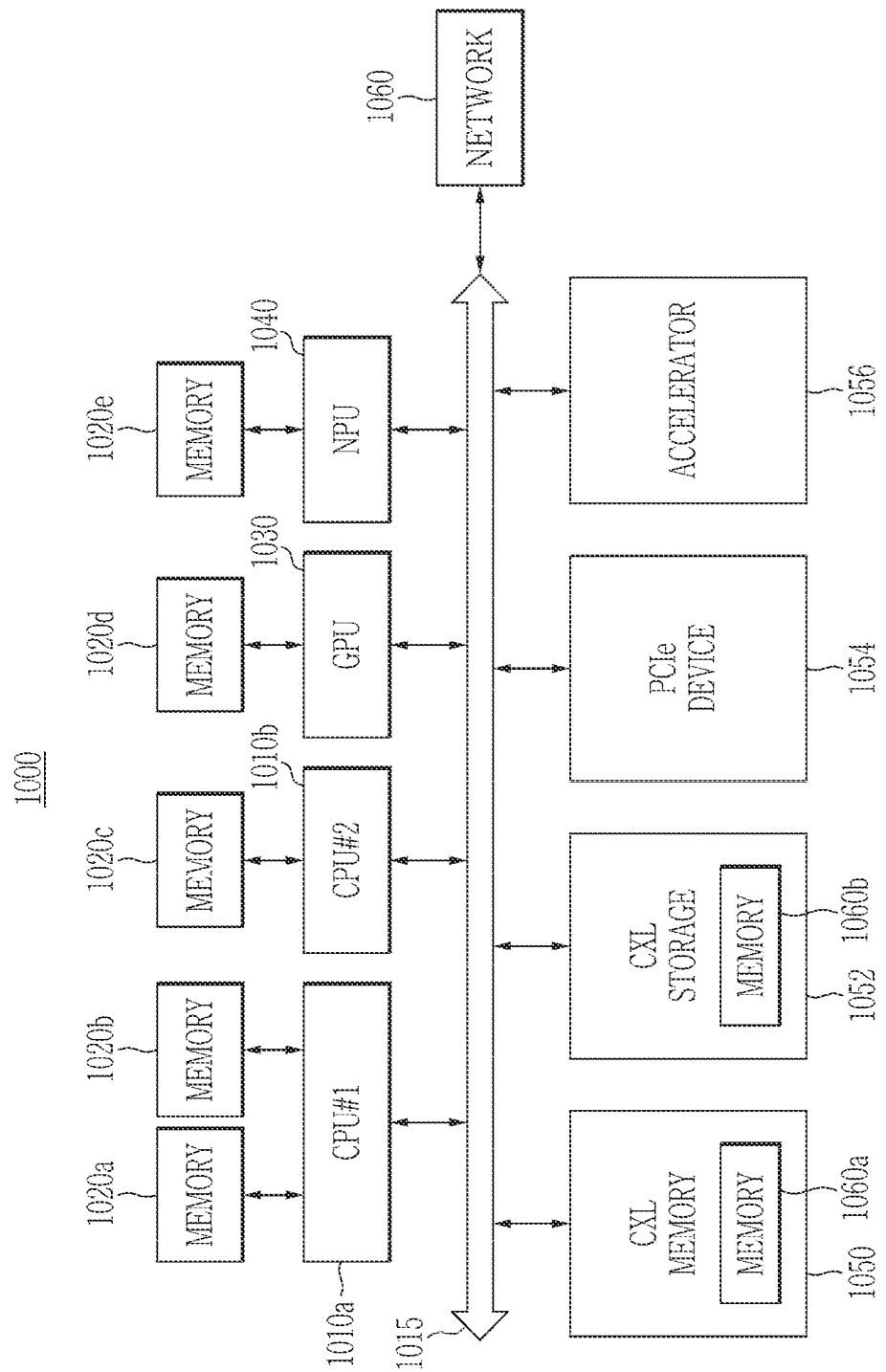
FIG. 8 is a block diagram illustrating a computer system according to some examples of embodiments.

FIG. 8 is a block diagram illustrating a computer system according to some examples of embodiments.

Referring to FIG. 8, a computer system 1000 may include a first CPU 1010a, a second CPU 1010b, a GPU 1030, an NPU 1040, a CXL switch 1015, a CXL memory 1050, a CXL storage 1052, a PCIe device 1054, and an accelerator (CXL device) 1056.

The first CPU 1010a, the second CPU 1010b, the GPU 1030, the NPU 1040, the CXL memory 1050, the CXL storage 1052, the PCIe device 1054, and the accelerator 1056 may be commonly connected to the CXL switch 1015 and communicate with each other through the CXL switch 1015.

In some embodiments, the first CPU 1010a, the second CPU 1010b, the GPU 1030, and the NPU 1040 may be hosts which have been described with reference to FIGS. 1 to 7, and may be directly connected to the individual memories 1020a, 1020b, 1020c, 1020d, and 1020e.

In some embodiments, the CXL memory 1050 and the CXL storage 1052 may be CXL devices which have been described with reference to FIGS. 1 to 7, and at least partial area of the memories 1060a and 1060b of the CXL memory 1050 and the CXL storage 1052 may be allocated as at least one cache buffer of the first CPU 1010a, the second CPU 1010b, the GPU 1030, the NPU 1040, the CXL memory 1050, the CXL storage 1052, the PCIe device 1054, and the accelerator 1056 by at least one or more of the first CPU 1010a, the second CPU 1010b, the GPU 1030, and the NPU 1040.

In some embodiments, the CXL switch 1015 may be connected to the PCIe device 1054 and/or the accelerator 1056, which may be configured to support various functions. The PCIe device 1054 or the accelerator 1056 may communicate with the first CPU 1010a, the second CPU 1010b, the GPU 1030, and/or the NPU 1040 via the CXL switch 1015 and/or access the CXL memory 1050 and the CXL storage 1052.

In some embodiments, the CXL switch 1015 may be connected to an external network 1060 or a fabric, and may be configured to communicate with an external server via the external network 1060 or the fabric.

Figure 9:
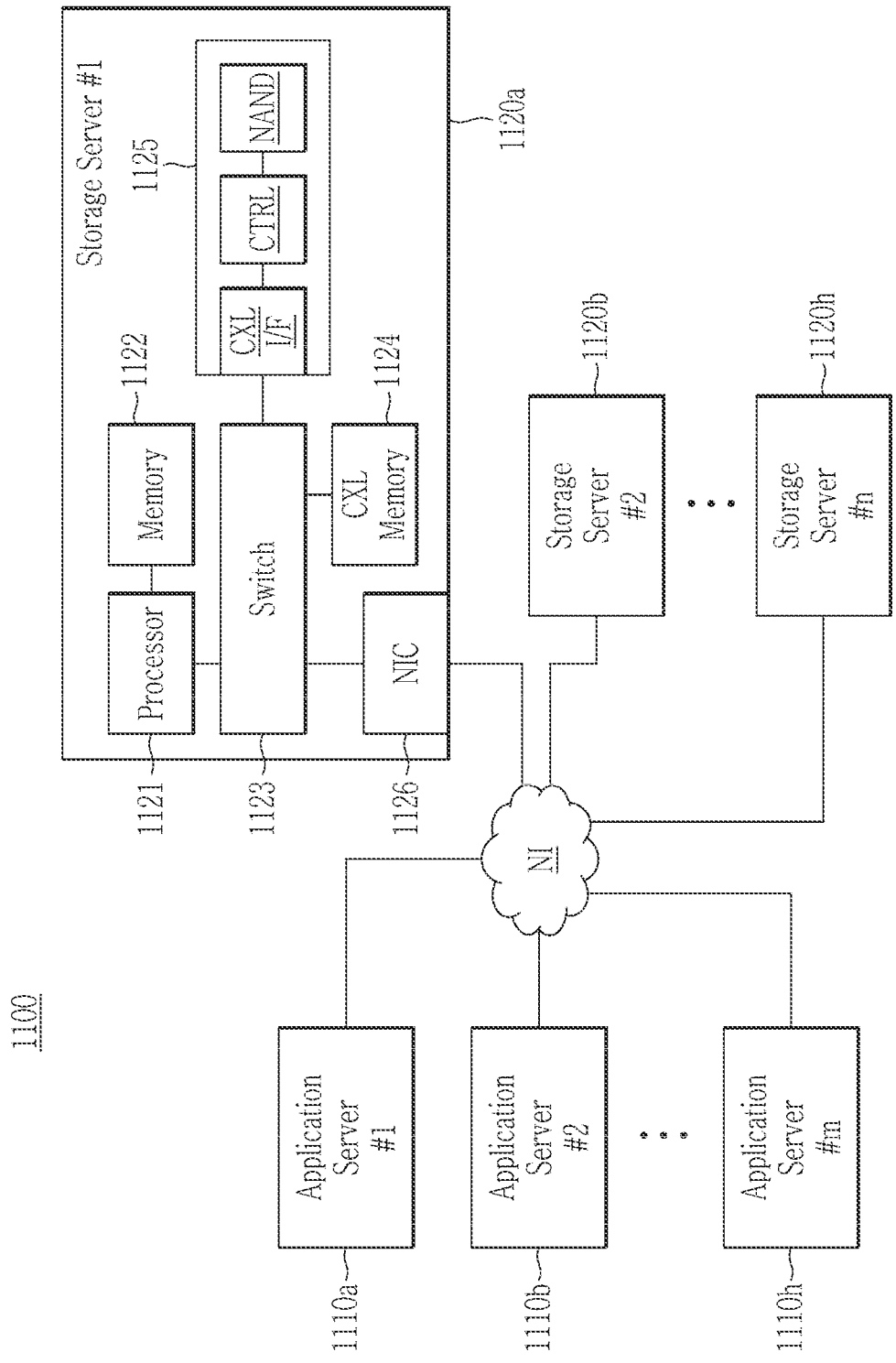
FIG. 9 is a block diagram illustrating a server system according to some examples of embodiments.

FIG. 9 is a block diagram illustrating a server system according to some examples of embodiments.

Referring to FIG. 9, a data center 1100 may be a facility which collects various data and provides services and may also be referred to as a data storage center. For example, the data center 1100 may be a system for operating a search engine or database, and/or may be a computer system used in enterprises such as banks or government agencies. The data center 1100 may include application servers 1110a, . . . , 1110h and storage servers 1120a, . . . , 1120h. A number of application servers 1110 and a number of storage servers 1120 may be selected in various ways and the number of application servers 1110 and the number of storage servers 1120 may be different.

Hereinafter, a configuration of the first storage server 1120a will be mainly described. Application servers 1110a, . . . , 1110h and storage servers 1120a, . . . , 1120h may have similar structures and the application servers 1110a, . . . , 1110h and the storage servers 1120a, . . . , 1120h may communicate with each other via a network NI.

The first storage server 1120a may include a processor 1121, a memory 1122, a switch 1123, a storage 1125, a CXL memory 1124, and a network interface card (NIC) 2216. The processor 1121 may control an overall operation of the first storage server 1120*a* and may access the memory 1122 to execute instructions loaded in the memory 1122 and/or process data. The processor 1121 and the memory 1122 may be directly connected and a number of processors 1121 and a number of memories 1122 included in one storage server 1120*a* may be selected and configured in various ways.

In some embodiments, the processor 1121 and the memory 1122 may provide a processor-memory pair. In some embodiments, the number of processors 1121 and the number of memories 1122 may be different. The processor 1121 may include a single core processor or a multi-core processor. The detailed description of the storage server 1120 may be applied to the application servers 1110*a*, . . . , 1110*h* in a similar way.

The switch 1123 may be configured to relay or route communications between various configurations and components included in the first storage server 1120*a*. In some embodiments, the switch 1123 may be a CXL switch described with reference to FIG. 8. That is, the switch 1123 may be a switch implemented based on the CXL protocol.

The CXL memory 1124 and the storage device 1125 may be CXL devices which have been described with reference to FIGS. 7 and 8.

The CXL memory 1124 may be connected to the switch 1123. The storage device 1125 may include a CXL interface circuit (CXL IF), a controller (CTRL), and a NAND flash. The storage device 1125 may store data and/or output stored data according to the request of the processor 1121.

In some embodiments, the application servers 1110*a*, . . . , 1110*h* may not include the storage device 1125.

The network interface card (NIC) 1126 may be connected to the CXL switch 1123. The NIC 1126 may communicate with other storage servers 1120*a*, . . . , 1120*h* or other application servers 1110*a*, . . . , 1110*h* via the network NI.

In some embodiments, the NIC 1126 may include a network interface card or a network adaptor. The NIC 1126 may be connected to the network NI by a wired interface, a wireless interface, a Bluetooth interface, and an optical interface. The NIC 1126 may include an internal memory, a digital signal processor (DSP), and a host bus interface and may be connected to the processor 1121 and/or the switch 1123 via the host bus interface. In some embodiments, the NIC 1126 may be integrated with at least one of the processor 1121, the switch 1123, and the storage device 1125.

In some embodiments, the network (NI) may be implemented using a fibre channel (FC) or Ethernet. FC may be a medium which is used for relatively higher speed data transfer and may use an optical switch, which may provide high performance/high applicability. According to the access method of the network (NI), the storage servers 1120*a*, . . . , 1120*h* may be provided as a file storage, a block storage, or an object storage.

In some embodiments, the network (NI) may be a storage exclusive network such as a storage area network (SAN). For example, the SAN may be a FC-SAN which uses a FC network and is implemented according to a FC protocol (FCP). As another example, the SAN may be IP-SAN which uses a TCP/IP network and is implemented according to SCSI over TCP/IP or internet SCSI (iSCSI) protocol. In some embodiments, the network (NI) may be a general network such as a TCP/IP network. For example, the network (NI) may be implemented according to a protocol such as a FC over Ethernet (FCoE), a network attached storage (NAS), or a NVMe over Fabrics (NVMe-oF).

In some embodiments, at least one of the application servers 1110*a*, . . . , 1110*h* may provide data which is requested by a user or a client to be stored in one of storage servers 1120*a*, . . . 1120*h* through the network NI. At least one of application servers 1110*a*, . . . , 1110*h* may obtain data which is requested by the user or the client to be read from one of the storage servers 1120*a*, . . . , 1120*h* through the network NI. For example, at least one of the application servers 1110*a*, . . . , 1110*h* may be implemented by a web server or a database management system (DBMS).

In some embodiments, at least one of the application servers 1110*a*, . . . , 1110*h* may access the memory, the CXL memory, or the storage device included in another application server through the network NI or access the memories, the CXL memories, or the storage devices included in the storage servers 1120*a*, . . . , 1120*h* through the network NI. By doing this, at least one of the application servers 1110*a*, . . . , 1110*h* may perform various operations on data stored in the another application servers 1110*a*, . . . , 1110*h* and/or the storage servers 1120*a*, . . . , 1120*h*. For example, at least one of the application servers 1110*a*, . . . , 1110*h* may execute an instruction to move or copy data between the other application servers 1110*a*, . . . , 1110*h* and/or storage servers 1120*a*, . . . , 1120*h*. The data may move from the storage device of the storage servers 1120*a*, . . . , 1120*h* to the memory or the CXL memory of the application servers 1110*a*, . . . , 1110*h* directly or via the memories or CXL memories of the storage servers 1120*a*, . . . , 1120*h*. Data which moves through the network NI may be encrypted data for the purpose of security or privacy.

In some embodiments, each constituent element or a combination of two or more constituent elements which have been described with reference to FIGS. 1 to 9 may be implemented by a digital circuit, a programmable or non-programmable logic device, an array, or an application specific integrated circuit (ASIC).

While the inventive concepts have been described in connection with what is presently considered to be practical examples of embodiments, it is to be understood that the inventive concepts are not limited to the disclosed embodiments. On the contrary, it is intended to cover various modifications and equivalent arrangements included within the scope of the appended claims.

What is claimed is:

1. A volatile memory device, comprising:
a time counter which is configured to output a count signal according to a predetermined time interval;
a use history circuit which is configured to write an operating time value based on the count signal that is received from the time counter and is configured to generate and write a validation value corresponding to the operating time value; and
a command decoder which is configured to receive an instruction from a memory controller, wherein the instruction is according to an operation mode that is determined based on the operating time value and the validation value.

2. The volatile memory device of claim 1, wherein the time counter includes:
a timer which is configured to output the count signal according to the predetermined time interval.

3. The volatile memory device of claim 1, wherein the time counter is configured to output the count signal according to the predetermined time interval based on a clock signal.

4. The volatile memory device of claim 1, wherein the use history circuit includes:
  a counter circuit which is configured to increase the operating time value when the count signal is received.

5. The volatile memory device of claim 1, further comprising:
  an encryption circuit which is configured to encrypt the operating time value and the validation value, resulting in an encrypted operating time value and encrypted validation value; and
  a decryption circuit which is configured to decrypt the encrypted operating time value and the encrypted validation value.

6. The volatile memory device of claim 5, wherein when the count signal is received, the use history circuit is configured to decrypt the encrypted operating time value using the decryption circuit and increase the decrypted operating time value, thereby updating the operating time value, and encrypt the updated operating time value using the encryption circuit.

7. The volatile memory device of claim 6, wherein the use history circuit is configured to update the validation value based on the updated operating time value and encrypt the updated validation value using the encryption circuit.

8. The volatile memory device of claim 5, further comprising:
  a read only memory (ROM) which is configured to store an encryption code and a decryption code;
  wherein the encryption circuit is configured to encrypt the operating time value and the validation value using the encryption code, and
  wherein the decryption circuit is configured to decrypt the encrypted operating time value and the encrypted validation value using the decryption code.

9. The volatile memory device of claim 1, wherein the use history circuit is configured to output the written operating time value and the written validation value in response to an operating time request command received from an external source.

10. The volatile memory device of claim 9, wherein the use history circuit is configured to decrypt an encrypted written operating time value and encrypted written validation value prior to outputting the written operating time value and the written validation value.

11. The volatile memory device of claim 1, wherein the use history circuit is configured to generate the validation value using the operating time value, a serial number, and a manufacturer code associated with the serial number.

12. A volatile memory device comprising:
  a command counter which is configured to output a count signal when a command is received;
  a use history circuit which is configured to write a number of processed commands based on the count signal and is configured to generate and write a validation value corresponding to the number of processed commands; and
  a command decoder which is configured to receive a first instruction from a memory controller, wherein the instruction is according to an operation mode that is determined based on the number of processed commands and the validation value.

13. The volatile memory device of claim 12,
  wherein the received command is at least one of a read command and a write command,
  wherein the operation mode is one of a first mode in which the volatile memory device is used for an accelerator, or a second mode in which the volatile memory device is used as a storage memory.

14. The volatile memory device of claim 12, wherein the command counter is connected to the command decoder, and wherein the command decoder is configured to decode a second instruction received from the memory controller to obtain and output the command to the command counter.

15. The volatile memory device of claim 12, further comprising:
  an encryption circuit which is configured to encrypt the number of processed commands and the validation value; and
  a decryption circuit which is configured to decrypt the encrypted number of processed commands and the encrypted validation value.

16. The volatile memory device of claim 15, wherein when the count signal is received, the use history circuit is configured to decrypt the encrypted number of processed commands using the decryption circuit and increase the decrypted number of processed commands, thereby updating the number of processed commands, and is configured to encrypt the updated number of processed commands using the encryption circuit.

17. The volatile memory device of claim 16, wherein the use history circuit is configured to update the validation value based on the updated number of processed commands and is configured to encrypt the updated validation value using the encryption circuit.

18. The volatile memory device of claim 12, wherein the use history circuit is configured to output the written number of processed commands and the written validation value in response to a request command for the number of processed commands received from an external source.

19. The volatile memory device of claim 12, wherein the use history circuit is configured to generate the validation value using the number of processed commands, a serial number, and a manufacturer code associated with the serial number.

20. A method for managing a use history of a volatile memory device, comprising:
  obtaining, by a use history circuit, a second use history by decrypting a first use history stored in the use history circuit, in response to receiving a count signal;
  obtaining, by the use history circuit, a third use history by updating the second use history;
  generating, by an encryption circuit, a fourth use history by encrypting the third use history;
  storing, by the use history circuit, the fourth use history;
  generating, by the use history circuit, a first validation value based on the third use history;
  generating, by the encryption circuit, a second validation value by encrypting the first validation value; and
  storing, by the use history circuit, the second validation value,
  wherein the fourth use history and the second validation value are used to determine an operation mode of the volatile memory device, and
  wherein the first to fourth use histories correspond to at least one of an operation time of the volatile memory device or a number of commands processed by the volatile memory device.

* * * * *